US007196797B2

(12) United States Patent
Bockman et al.

(10) Patent No.: US 7,196,797 B2
(45) Date of Patent: Mar. 27, 2007

(54) DIFFERENTIAL INTERFEROMETER WITH IMPROVED CYCLIC NONLINEARITY

(75) Inventors: John J. Bockman, Santa Clara, CA (US); Ludmila M. Golyanskaya, Saratoga, CA (US); Kenneth J. Wayne, Saratoga, CA (US); Miao Zhu, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 319 days.

(21) Appl. No.: 10/857,053

(22) Filed: May 28, 2004

(65) Prior Publication Data

US 2005/0264822 A1   Dec. 1, 2005

(51) Int. Cl.
   *G01B 9/02*   (2006.01)
   *G02B 5/30*   (2006.01)
(52) U.S. Cl. ..................... 356/492; 359/485
(58) Field of Classification Search ........ 356/491–493, 356/487; 359/494, 495, 485, 500
   See application file for complete search history.

(56) References Cited

U.S. PATENT DOCUMENTS

| 4,175,830 | A | * | 11/1979 | Marie ......................... 359/484 |
| 4,693,605 | A | | 9/1987 | Sommargren |
| 4,930,894 | A | | 6/1990 | Baldwin |
| 6,170,795 | B1 | * | 1/2001 | Wayne ....................... 248/664 |
| 6,621,578 | B1 | * | 9/2003 | Mizoguchi .................. 356/369 |
| 6,806,962 | B2 | * | 10/2004 | Hill ............................. 356/493 |
| 7,009,711 | B2 | * | 3/2006 | Hill ............................. 356/493 |

* cited by examiner

*Primary Examiner*—Gregory J. Toatley, Jr.
*Assistant Examiner*—Marissa J. Detschel

(57) ABSTRACT

An interferometer system includes a plane mirror interferometer, a turning mirror, a retardation plate assembly having a retardation plate that can be adjusted and then fixed, and a retroreflector. A light beam travels in a path comprising the plane mirror interferometer, the turning mirror, the retardation plate assembly, and the retroreflector. The retardation plate assembly may include a plurality of bearings, a ring riding on the bearings, the retardation plate mounted to the ring, and a plunger pushing the ring against the bearings. The retardation plate may be fixed by adhesive after determining an orientation that produces little polarization leakage in the system.

18 Claims, 5 Drawing Sheets

DIFFERENTIAL INTERFEROMETER WITH IMPROVED CYCLIC NONLINEARITY

CROSS REFERENCE TO RELATED APPLICATIONS

This application is related to U.S. patent application No. 10/857,792, entitled "Polarization-Maintaining Retroreflector Apparatus," and U.S. patent application No. 10/856,204, entitled "Systems Using Polarization-Manipulating Retroreflectors," which are concurrently filed, commonly assigned, and incorporated herein by reference.

DESCRIPTION OF RELATED ART

In differential interferometers, such as those described by U.S. Pat. Nos. 4,930,894 ("Baldwin") and 4,693,605, cyclic nonlinearities arise from polarization leakage of the reference beam into the measurement path and vice versa. Sources of polarization degradation (i.e., undesired polarization changes), hence leakage, in these interferometers include imperfect polarizing coatings, imperfect retardation plates, and polarization transformation by silver coated cube corner retroreflectors.

In one interferometer described by Baldwin and reproduced in FIG. 1, a significant source of ⅛ wave nonlinearity arises in the "differential adapter," which consists of a turning mirror 150, a quarter-wave plate 14, and a silver coated cube corner retroreflector 13. Quarter-wave plate 14 is oriented to convert incident linearly polarized light into circularly polarized light on its way to silver coated cube corner 13. By its construction, silver coated cube corner 13 degrades the circular polarization and outputs elliptically polarized light with its major axis rotated such that when the light is returned for a second pass through quarter-wave plate 14, the output light is not perfectly linearly polarized. The light now has a linearly polarized component orthogonal to the desired polarization state. This component is polarization leakage that results in cyclic nonlinearity error.

Thus, what are needed are an apparatus and a method for addressing the polarization leakage in differential interferometer systems, and specifically polarization leakage caused by a quarter-wave plate in the path to a silver coated cube corner.

SUMMARY

In one embodiment of the invention, an interferometer system includes a plane mirror interferometer, a turning mirror, a retardation plate assembly having a retardation plate that can be adjusted and then fixed, and a retroreflector. A light beam travels in a path comprising the plane mirror interferometer, the turning mirror, the retardation plate assembly, and the retroreflector. In one embodiment, the retardation plate assembly includes a plurality of bearings, a ring riding on the bearings, the retardation plate mounted to the ring, and a plunger pushing the ring against the bearings. In one embodiment, the retardation plate is fixed by adhesive after determining an orientation that produces little polarization leakage in the system.

BRIEF DESCRIPTION OF THE DRAWINGS

Use of the same reference numbers in different figures indicates similar or identical elements.

DETAILED DESCRIPTION

Figure 1:
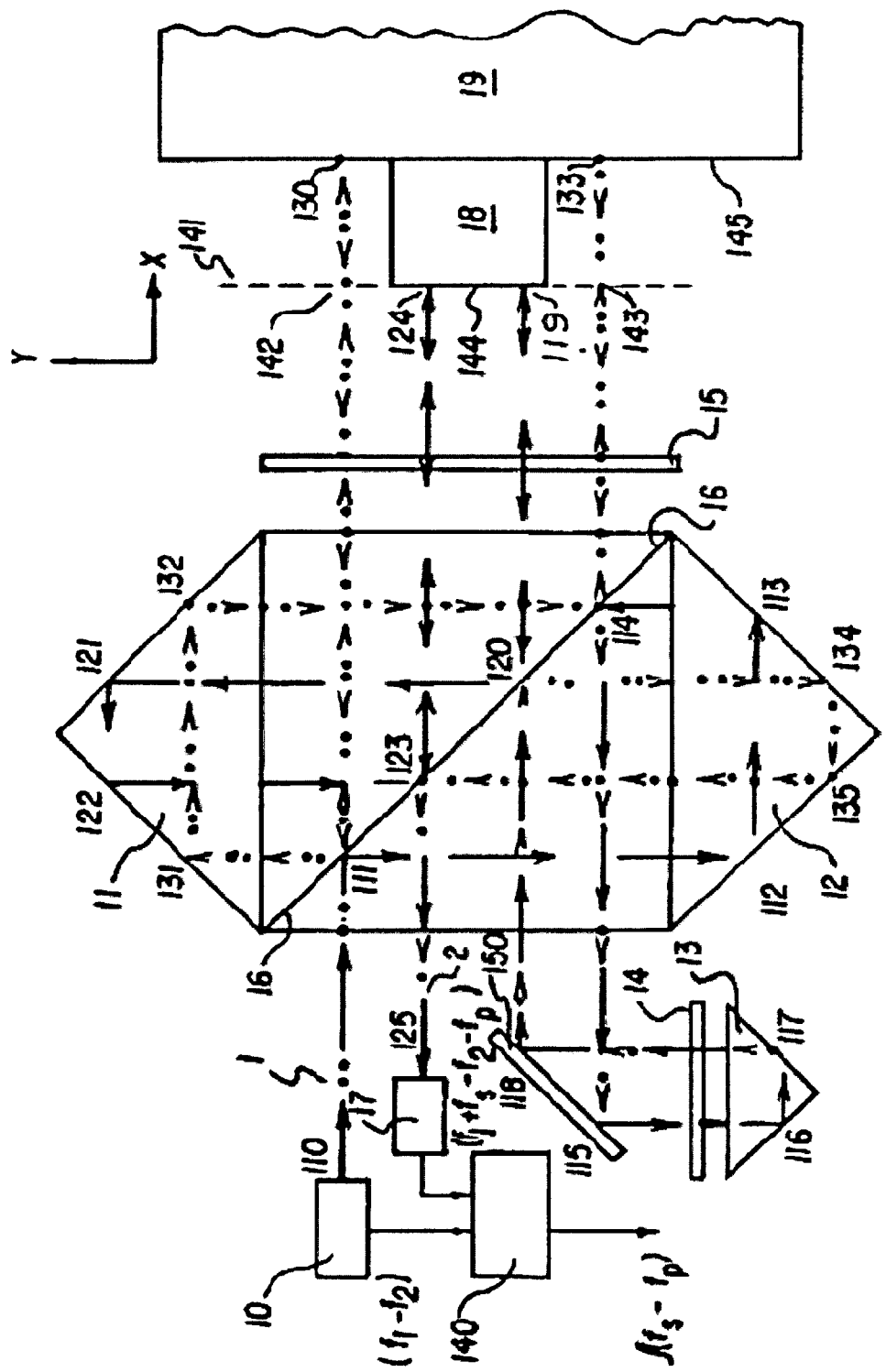
FIG. 1 illustrates a conventional differential interferometer system.
Figure 2:
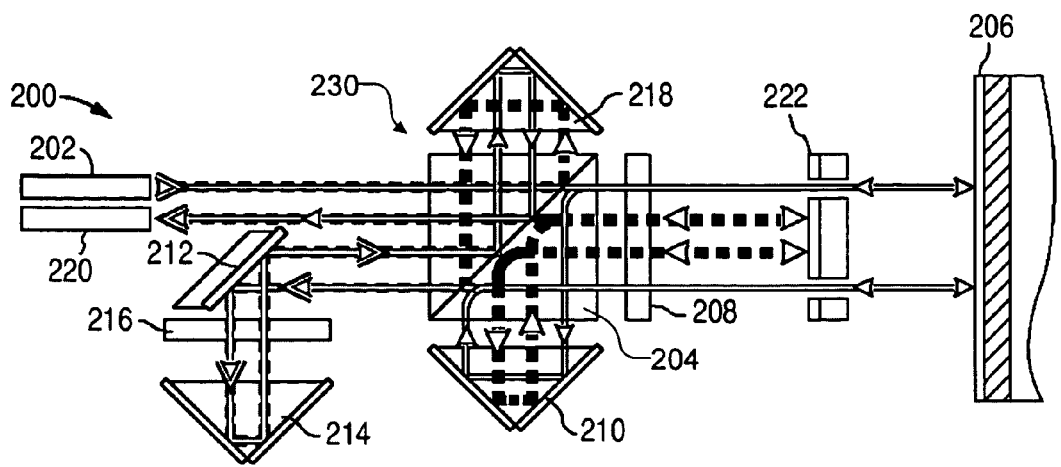
FIGS. 2 and 3 illustrate a differential interferometer system in one embodiment of the invention.
Figure 3:
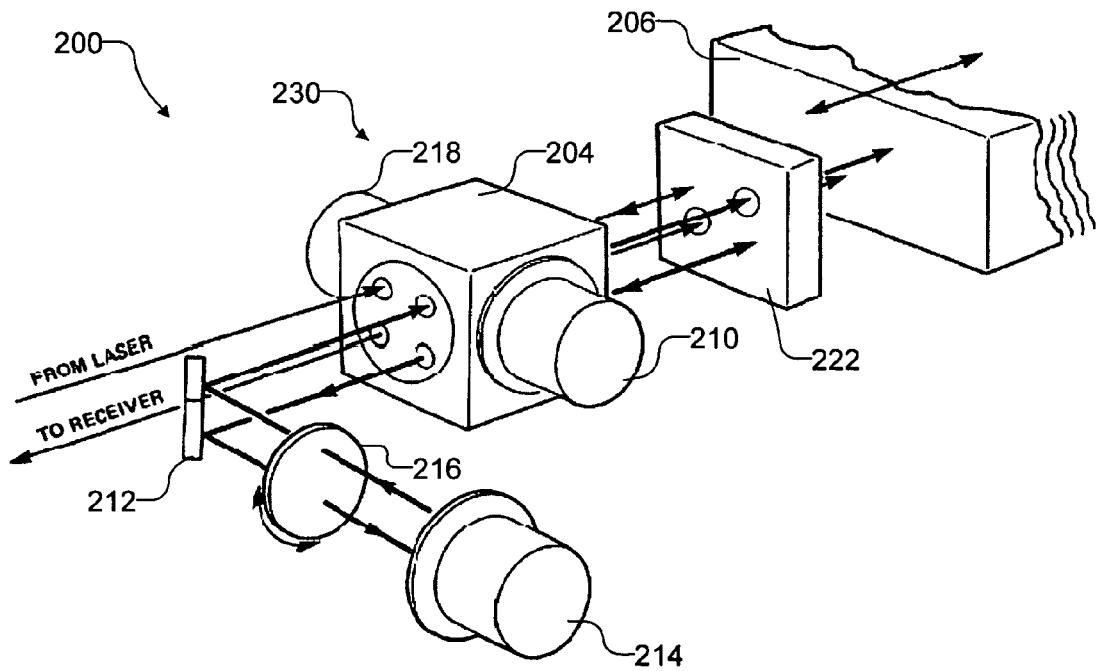

FIGS. 2 and 3 illustrate a differential interferometer system 200 in one embodiment of the invention. A laser head 202 generates a coherent, collimated light beam consisting of two orthogonally polarized frequency components. One frequency component $f_A$ (e.g., a measurement beam having a P-polarization) enters the system's measurement path while the other frequency component $f_B$ (e.g., a reference beam having an S-polarization) enters the system's reference path.

In the measurement path, a polarizing beam-splitter 204 transmits frequency component $f_A$ to a measurement plane mirror 206 mounted to a moving stage. Since frequency component $f_A$ passes through a quarter-wave plate 208, the returning polarization is rotated 90 degrees and the newly S-polarized frequency component $f_A$ is reflected by polarizing beam-splitter 204 to a cube corner retroreflector 210. Cube corner 210 directs frequency component $f_A$ again to polarizing beam-splitter 204, which again reflects frequency component $f_A$ to measurement plane mirror 206. Again, since frequency component $f_A$ passes through quarter-wave plate 208, the returning polarization is rotated 90 degrees and the newly P-polarized frequency component $f_A$ is transmitted through polarizing beam-splitter 204 to a turning mirror 212.

Turning mirror 212 directs frequency component $f_A$ through a retardation plate assembly 216 (shown in more detail in FIGS. 4, 5, and 6) onto a silver coated cube corner retroreflector 214, which returns frequency component $f_A$ back to mirror 212. Since frequency component $f_A$ passes through a quarter-wave plate in assembly 216, the returning polarization is ideally (but not actually) rotated 90 degrees. Mirror 212 then returns the newly S-polarized frequency component $f_A$ to polarizing beam-splitter 204, which reflects frequency component $f_A$ to a cube corner retroreflector 218. Cube corner 218 returns frequency component $f_A$ to polarizing beam-splitter 204, which reflects frequency component $f_A$ to a receiver 220. Note that turning mirror 212 is used to make system 200 more compact. If a larger system 200 is constructed, turning mirror 212 may be eliminated and cube corner 214 placed directly behind polarizing beam-splitter 204 with assembly 216 in between.

In a conventional setup, the fast (or slow) axis of the quarter-wave plate in assembly 216 would be oriented 45° to the polarization vector in order to convert the incident linearly polarized light into circularly polarized light. Unfortunately, in such a setup, the silver coated cube corner 214 would transform the circularly polarized light in the input beam so that the light in the output beam is elliptically polarized. When this elliptically polarized light is returned for a second pass through the quarter-wave plate in assembly 216, the output would not be in the desired linear polarization state, i.e., perfectly linear polarization along the direction orthogonal to the polarization of the input beam. Instead, the output would have a linearly polarized component orthogonal to the desired linear polarization state.

Thus, the ideal alignment for the fast axis of the quarter-wave plate for converting linear polarization to circular polarization (i.e., 45° to the polarization vector) is not ideal when the circularly polarized light subsequently passes through a silver coated cube corner. With a silver coated cube corner in the path, there exists a rotational "sweet spot" for the fast axis that takes advantage of the polarization-transforming effect of the silver coated cube corner. This sweet spot does not produce perfectly circularly polarized light out of the first pass through the quarter-wave plate. However, this sweet spot causes the silver coated cube corner to output an elliptical polarization state that, after returning through the quarter-wave plate, has a smaller, linearly polarized component orthogonal to the desired linear polarization state. The result is that after the return pass through the quarter-wave plate, the original linear polarization state is substantially preserved but, of course, rotated 90°. This in turn produces less polarization leakage and hence smaller cyclic nonlinearity in the interferometric measurements.

In general, in the differential interferometer system 200, a retardation plate can be chosen according to the properties of the silver coating on the cube corner so that the combination of this retardation plate, oriented at its "sweet spot," and the silver coated cube corner retroreflector gives an even smaller linearly polarized component orthogonal to the desired linear polarization state than the one obtained from the combination of the quarter-wave plate and the silver coated cube corner. For example, a linear retardation plate with a retardation angle of 90.189° gives a smaller unwanted linear component than the quarter-wave plate (retardation angle=90°) when it is combined with a silver-coated cube corner. Similarly, a retardation plate can be chosen for a cube corner with another type of coating so that the combination of this retardation plate and the cube corner minimizes the linearly polarized component orthogonal to the desired linear polarization state.

Figure 4:
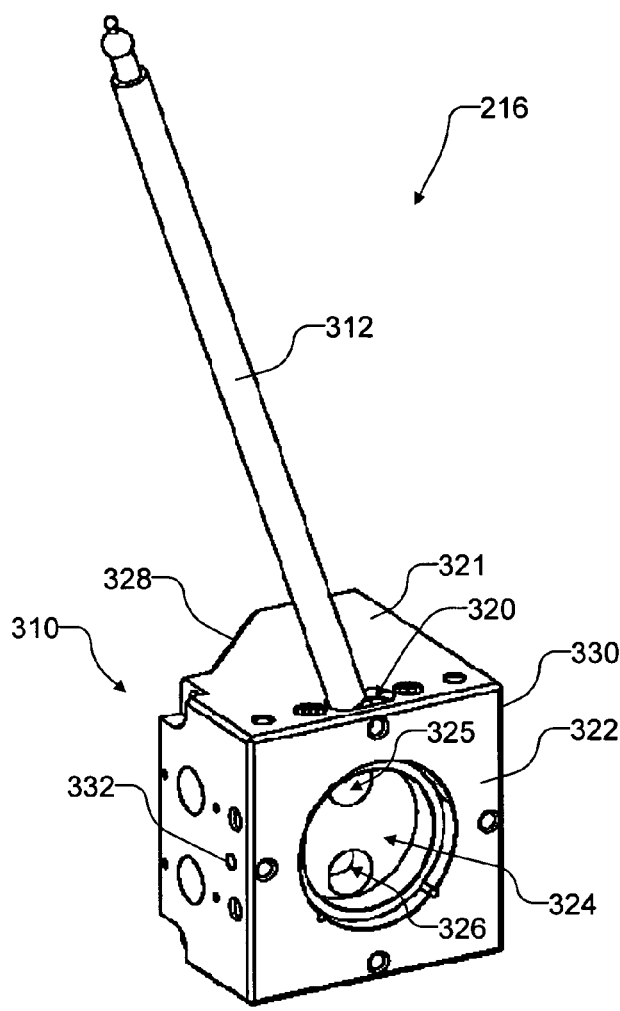
FIGS. 4, 5, and 6 illustrate a retardation plate assembly that allows for precise, in situ adjustment of the retardation plate in the interferometer system of FIGS. 2 and 3 in one embodiment of the invention.
Figure 5:
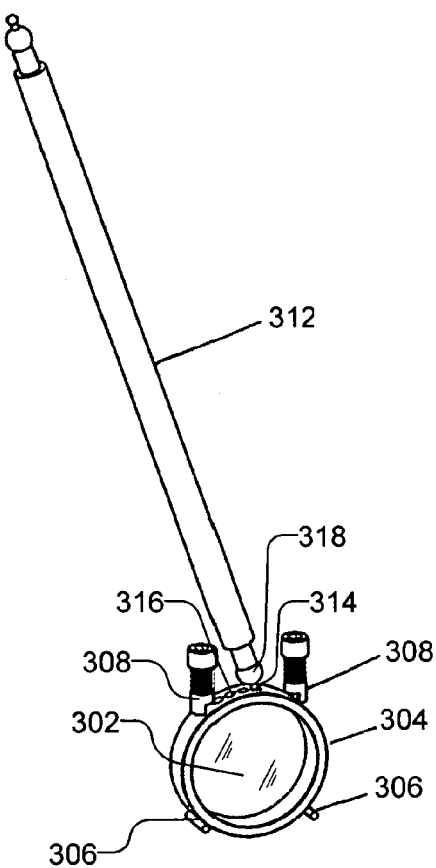
Figure 6:
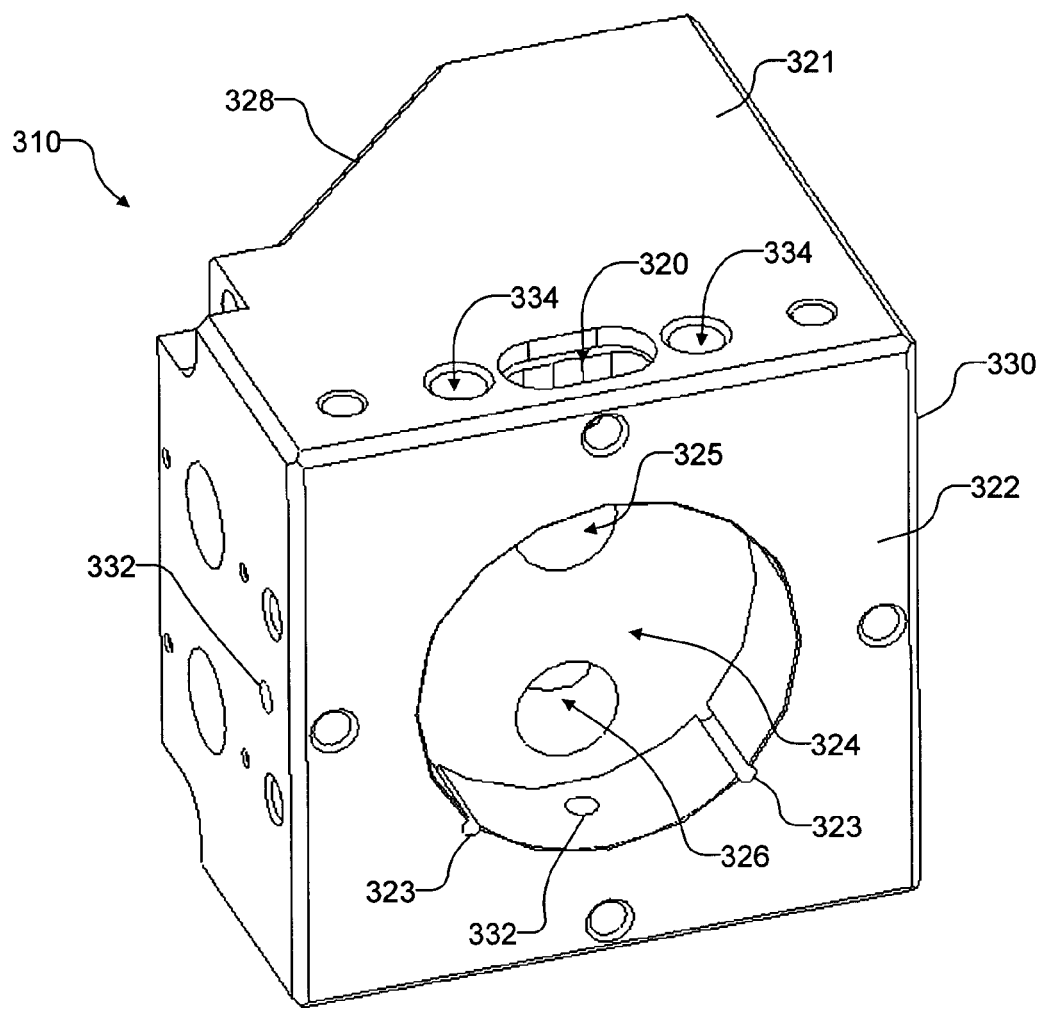

FIGS. 4, 5, and 6 illustrate a retardation plate assembly 216 that allows for precise, in situ rotational alignment of the quarter-wave plate in one embodiment of the invention. A quarter-wave plate 302 is fixed to a ring 304 with adhesive. In one embodiment, quarter-wave plate 302 is made of quartz and ring 304 is made of brass. Ring 304 is kinematically supported by two bearing pins 306 that form a "V block bearing". In one embodiment, bearing pins 306 are made of Delrin AF. Ring 304 is forced into the V block bearing by two spring loaded plungers 308 mounted to a housing 310 within the V block contact lines. In one embodiment, plungers 308 are made of Delrin AF.

A housing 310 includes a face 322 that defines a circular recess 324 for receiving ring 304. Along the circumference of circular recess 324 are slots 323 (FIG. 6) for receiving bearing pins 306. Silver coated cube corner 214 can be mounted to housing 310 on face 322. Turning mirror 212 can be mounted to housing 310 on a face 328 oriented 45° to face 322. Bores 325 and 326 are defined between faces 322 and 328 to provide the offset paths between turning mirror 212 and cube corner 210.

A plane mirror interferometer 230 (consisting of beam-splitter 204, cube corners 210 and 218, and quarter-wave plate 208) can be mounted to housing 310 on a face 330, which is oriented orthogonal to face 322. Bores are defined between faces 328 and 330 to provide the offset paths between turning mirror 212 and plane mirror interferometer 230. Glue holes 332 leading to circular recess 324 are provided on the faces of housing 310.

Fine rotational position control of ring 304 (and quarter-wave plate 302) is achieved with a dual ball lever 312. A small ball 314 (on top of a large ball 318) engages one of the radial holes 316 in ring 304. Large ball 318 engages a fulcrum hole 320 and acts as the fulcrum for a first class lever. Fulcrum hole 320 and plunger mounting holes 334 (FIG. 6) are located on face 321 of housing 310 and are connected to circular recess 324.

The combination of high leverage and low friction between ring 304 and bearing pins 306 allows precise alignment of the sweet spot for the quarter-wave plate fast axis to the polarization vector. The spring loaded plungers 308 hold the position of quarter-wave plate 304 once lever 312 is removed. Adhesive is then injected through glue holes 332 to fix the position of ring 304.

Referring back to FIGS. 2 and 3, in the reference path, polarizing beam-splitter 204 reflects frequency component $f_B$ to a cube corner 218. Cube corner 218 returns frequency component $f_B$ to polarizing beam-splitter 204, which reflects frequency component $f_B$ to mirror 212. Mirror 212 directs frequency component $f_B$ to silver coated cube corner 214, which returns frequency component $f_B$ back to mirror 212. Since frequency component $f_B$ passes through quarter-wave plate 216, the returning polarization is rotated 90 degrees.

Mirror 212 directs the newly P-polarized frequency component $f_B$ to polarizing beam-splitter 204, which transmitted frequency component $f_B$ to a reference mirror 222 that may move. Since frequency component $f_B$ passes through quarter-wave plate 208, the returning polarization is rotated 90 degrees and the newly S-polarized frequency component $f_B$ is reflected by polarizing beam-splitter 204 to cube corner 210. Cube corner 210 returns frequency component $f_B$ to polarizing beam-splitter 204, which again reflects frequency component $f_B$ to reference mirror 222. Again, since frequency component $f_B$ passes through quarter-wave plate 208, the returning polarization is rotated 90 degrees and the P-polarized frequency component $f_B$ is transmitted through polarizing beam-splitter 204 onto receiver 220.

Figure 7:
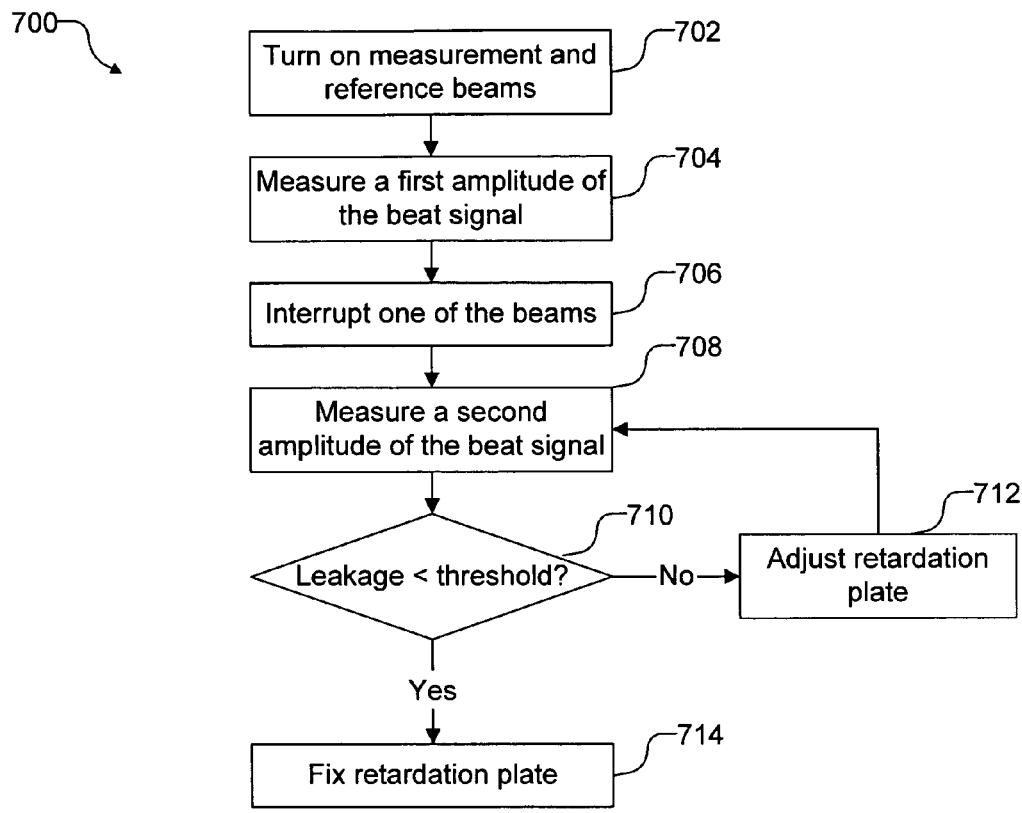
FIG. 7 is a flowchart of a method for adjusting the retardation plate assembly in a differential interferometer system to reduce polarization leakage in one embodiment of the invention.

FIG. 7 is a flowchart of a method 700 for searching the sweet spot for the quarter-wave plate fast axis in interferometer system 200 in one embodiment of the invention.

In step 702, the measurement and reference beams are both turned on to propagate through the measurement and reference paths in an assembled interferometer system 200.

In step 704, the amplitude (hereafter "first amplitude") of the beat signal from the recombined measurement and reference beams is measured.

In step 706, one of the beams (measurement or reference) is interrupted (e.g., blocked). Theoretically, if there is no polarization leakage, then the beat signal would cease. However, if there is polarization leakage, a detectable beat signal would remain (at the original beat frequency).

In step 708, the amplitude (hereafter "second amplitude") of the beat signal at the original beat frequency is measured again.

In step 710, it is determined if the polarization leakage is below a threshold, which signifies that the sweet spot for the fast axis of quarter-wave plate 302 in assembly 216 has been found. In one embodiment, the polarization leakage is defined as the ratio of the second amplitude to the first amplitude. If the polarization leakage is not less than the threshold, then step 710 is followed by step 712. Otherwise step 710 is followed by step 714.

In step 712, the fast axis of quarter-wave plate 302 in assembly 216 is adjusted. As described above in reference to FIGS. 4, 5, and 6, the fast axis of quarter-wave plate 302 is adjusted by using lever 312. Step 712 is followed by step 708 and the process is repeated until the sweet spot for the fast axis of quarter-wave plate 302 is found.

In step 714, the fast axis of quarter-wave plate 302 is fixed. As described above in reference to FIGS. 4, 5, and 6, adhesive is injected through glue holes 332 of housing 310 to fix the orientation of ring 304 and quarter-wave plate 302.

Figure 8:
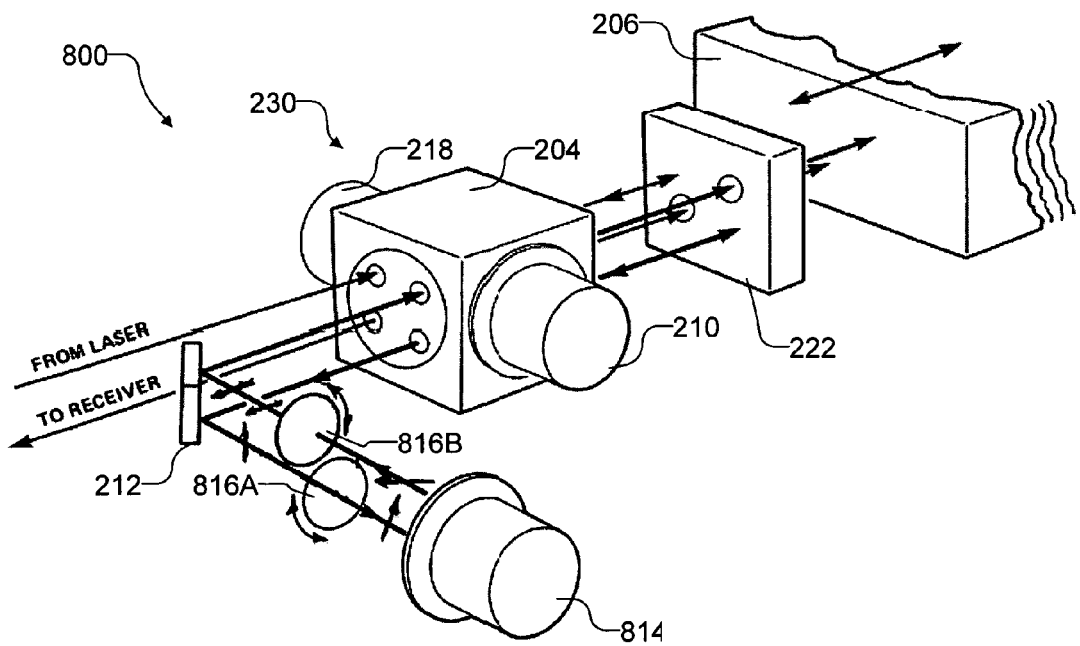
FIG. 8 illustrates a differential interferometer system in another embodiment of the invention.

FIG. 8 illustrates a differential interferometer system 800 in one embodiment of invention. System 800 is similar to system 200 except that retardation plate assembly 216 is replaced by an input half-wave plate assembly 816A in the input path and an output half-wave plate assembly 816B in the output path, and silver coated cube corner 214 is replaced with an uncoated, TIR (total internal reflection) cube corner retroreflector 814. It has been determined that a properly oriented TIR cube corner 814 preserves orthogonal linear (horizontal/vertical) polarizations in transit if they are rotated by 13.7° counterclockwise at the input (looking into the cube corner). The output polarizations remain linear but rotated by 13.7° in the opposite direction looking into the cube corner. The 13.7° rotation angle depends on the properties of the cube corner material. For the common optical glass BK-7, the rotation angle is close to 13.7°.

Input half-wave plate assembly 816A is adjusted in situ to rotate the linearly polarized input to TIR cube corner 814 by 13.7°. Output half-wave plate assembly 816B is adjusted in situ to rotate the resultant linearly polarized output by 13.7°+/−90° so that for each of the frequency components $f_A$ and $f_B$, the returning beam is linearly polarized along the direction orthogonal to the polarization direction of the input beam. System 800 eliminates the undesirable polarization transformation caused by silver coated cube corners altogether. Furthermore, it improves retroreflection efficiency and polarization conversion of vertically polarized light to horizontally polarized light and vice versa. In one embodiment, assemblies 816A and 816B are constructed like assembly 216 in FIGS. 4, 5, and 6 with a half-wave plate instead of a quarter-wave plate.

Method 700 described above can be modified to reduce the polarization leakage of system 800. Instead of adjusting a single quarter-wave plate in step 712, two half-wave plates are adjusted to search for a sweet spot where the polarization leakage is below a threshold.

Various other adaptations and combinations of features of the embodiments disclosed are within the scope of the invention. While the illustrated embodiments utilize plane mirrors and cube corner retroreflectors, other reflective, refractive, diffractive, and holographic components may be substituted. Furthermore, a single spring-loaded plunger 308 centered between the contact lines of bearing pins 306 can be used in place of two spring-loaded plungers 308. In addition, instead of silver coated cube corner 214, cube corners coated with other material may be used. The mechanical bearings described in these embodiments are of stable, kinematic design using anti-friction materials. Clearly, less stable, inefficient bearings may be substituted, such as a simple journal bearing comprised of ring 304 running in circular recess 324. Furthermore, a true kinematic design may be used, such as three bearing balls that support ring 304. Numerous embodiments are encompassed by the following claims.

What is claimed is:

1. A retardation plate assembly, comprising:
   a plurality of bearings;
   a ring having a first half riding on the bearings;
   a retardation plate mounted to the ring; and
   a spring loaded plunger pushing a second half of the ring against the bearings.

2. The assembly of claim 1, wherein the retardation plate is selected from the group consisting of a quarter-wave plate and a half-wave plate.

3. A retardation plate assembly, comprising:
   a plurality of bearings;
   a ring riding on the bearings;
   a retardation plate mounted to the ring;
   a plunger pushing the ring against the bearings;
   a lever comprising one end having a large ball and a small ball on the large ball;
   a housing comprising:
     a first face defining a circular recess for receiving the ring;
     a second face defining a fulcrum hole connected to the circular recess;
   wherein the large ball engages the fulcrum hole and the small ball engages a radial hole on the ring, the large ball acting as a fulcrum for the lever to rotate the ring.

4. The assembly of claim 3, wherein the bearings are pin bearings and the circular recess further comprises slots for receiving the pin bearings.

5. The assembly of claim 3, wherein the housing further defines glue holes to the circular recess.

6. The assembly of claim 3, wherein the second face further defines a plunger mounting hole connected to the circular recess, the plunger mounting hole receiving the plunger.

7. The assembly of claim 3, wherein the housing further comprises a third face oriented 45° to the first face, the third face receiving a turning mirror.

8. The assembly of claim 7, wherein the housing further comprises a fourth face oriented orthogonal to the first face, the housing further defining bores between the first face and the third face, and between the third face and the fourth face.

9. The assembly of claim 8, wherein the fourth face receives a plane mirror interferometer.

10. An interferometer system, comprising:
    a plane mirror interferometer;
    a retardation plate assembly having a retardation plate that is rotated about an axis orthogonal to an incident plane of the retardation plate and then fixed;
    a retroreflector;
    wherein a light beam travels in a path comprising the plane mirror interferometer, the retardation plate assembly, and the retroreflector.

11. The system of claim 10, further comprising a turning mirror in the path between the plane mirror interferometer and the retardation plate assembly.

12. The system of claim 11, wherein the retroreflector comprises a coated cube corner, the retardation plate comprises a quarter-wave plate, and the path further comprises, after the retroreflector, the retardation plate assembly, the turning mirror, and the plane mirror interferometer.

13. The system of claim 12, wherein the coated cube corner comprises a silver coated cube corner.

14. The system of claim 10, wherein the retardation plate assembly comprises:
    a plurality of bearings;
    a ring having a first half riding on the bearings;
    the retardation plate mounted to the ring; and
    a spring loaded plunger pushing a second half of the ring against the bearings.

15. The system of claim 10, wherein the retroreflector comprises a coated cube corner and the retardation plate is selected based on a coating material of the coated cube corner.

16. The system of claim 10, wherein the retardation plate assembly further comprises:
a plurality of bearings;
a ring riding on the bearings, wherein the retardation plate is mounted to the ring;
a plunger pushing the ring against the bearings;
a lever comprising one end having a large ball and a small ball on the large ball;
a housing comprising:
a first face defining a circular recess for receiving the ring;
a second face defining a fulcrum hole connected to the circular recess, wherein the large ball engages the fulcrum hole and the small ball engages a radial hole on the ring, the large ball acting as a fulcrum for the lever to rotate the ring.

17. An interferometer system, comprising:
a plane mirror interferometer;
a retardation plate assembly having a retardation plate that is adjusted and then fixed;
a turning mirror;
a retroreflector;
another retardation plate assembly having another retardation plate that is adjusted and then fixed, wherein:
the retroreflector comprises a TIR (total internal reflection) cube corner;
the retardation plate and said another retardation plate comprise half-wave plates; and
a light beam travels in a path comprising the plane mirror interferometer, the turning mirror, the retardation plate assembly, the retroreflector, said another retardation plate assembly, the turning mirror, and the plane mirror interferometer.

18. The system of claim 17, wherein a fast or slow axis of the retardation plate is oriented to rotate the polarization of the light to the TIR cube corner by 13.7° and another fast or slow axis of said another retardation plate is oriented to rotate the polarization of the light from the TIR cube corner by 13.7°+/−90°.

* * * * *